Feb. 27, 1923.
F. C. MORRIS
DOUGH CUTTER
Filed Oct. 27, 1921
1,446,513
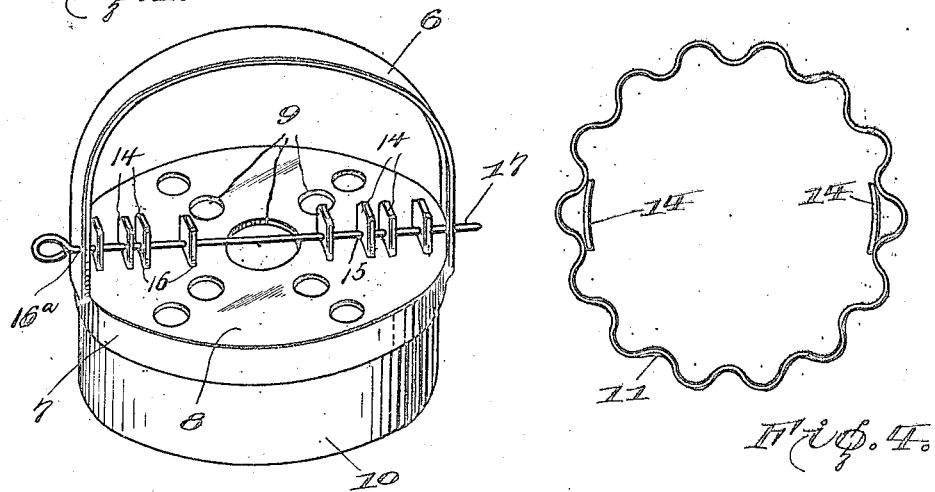
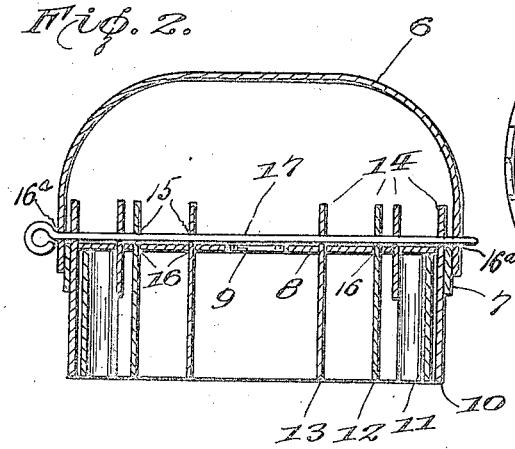
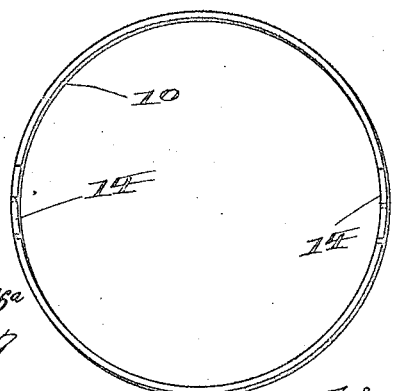
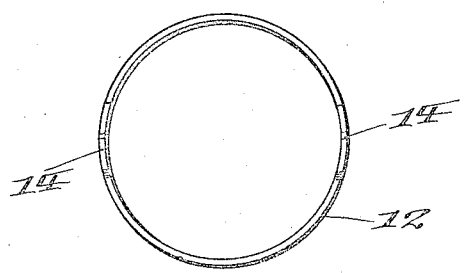
Inventor:
F. C. Morris.
By _____ Attorneys.

Patented Feb. 27, 1923.

1,446,513

UNITED STATES PATENT OFFICE.

FREDERICK COX MORRIS, OF SYDNEY, NOVA SCOTIA, CANADA.

DOUGH CUTTER.

Application filed October 27, 1921. Serial No. 510,963.

*To all whom it may concern:*

Be it known that I, FREDERICK C. MORRIS, a citizen of Canada, residing at Sydney, C. B., Nova Scotia, Canada, have invented new and useful Improvements in Dough Cutters, of which the following is a specification.

The device which is the subject matter of the present application for patent has been designed for cutting dough, and its object is to provide a device of this kind of novel and improved construction which permits the device to be converted for cutting the dough into various shapes.

The object stated is attained by means of a combination and arrangement of parts to be hereinafter described and claimed, and in order that the same may be better understood, reference is had to the accompanying drawing, forming a part of this specification.

In the drawing:

Figure 1 is a perspective view of the device; Fig. 2 is a cross-section thereof, and Figs. 3 to 6 are plan views of different cutting blades detached.

Referring specifically to the drawing, the device consists of a number of blades carried by a supporting member or holder which is provided with an arched handle 6. The supporting member consists of an annular side wall 7 of suitable height, and a top 8, the latter being provided with perforations 9. The cutting blades are all annular and they are mounted inside the supporting member, their height being such that they project below the bottom edge of the wall 7. The device is shown provided with four cutters, the same being denoted by the reference characters 10, 11, 12 and 13, respectively. These cutters are all annular in form, and each has a pair of diametrically opposite ears 14 rising from its top edge and provided each with a perforation 15. The top 8 of the supporting member has slots 16 through which the ears 14 are adapted to be passed so as to locate the perforations 15 above said top and in line with perforations 16ª in the ends of the handle 6 near the top 8. A rod-like coupling member 17 is then passed through the alined perforations for securing the cutters in place. The cutter 11 is corrugated, whereas the other cutters are plain. It will also be noted that the cutters are all of different diameters so that the entire set may be attached to the supporting member or holder, they seating concentrically inside the side wall 7 thereof and projecting from the bottom edge thereof.

Any one or all of the cutters may be used at one time. The cutter 10 used alone is for cutting dough to make biscuits, round cookies, tart bottoms, etc. The cutter 11 is designed for making fluted cookies, and cutter 12 for small biscuits or cookies. Cutters 10 and 12, together, will be used for making the rings of tarts, and cutters 10 and 13, together, will be used for making doughnuts. The cutters can be easily and quickly applied to the holder and removed therefrom, and the invention provides a very simple and efficient dough cutter capable of being used in many ways and for various purposes.

The purpose of the perforations 9 in the top of the device is to permit the escape of air from the inside when the device is being operated.

I claim:

1. A dough cutter comprising a holder consisting of an annular side wall and a top, said top having slots, a plurality of annular cutters seating concentrically within the side wall and projecting from the bottom thereof, said cutters having upstanding top ears which pass removably through the aforesaid slots and are perforated above the top of the holder, and a coupling-rod passing through said perforations and removable therefrom.

2. A dough cutter comprising a holder consisting of an annular side wall and a top, said top having slots, an arched handle rising from the holder top and having perforations in its ends adjacent to said top, a plurality of annular cutters seating concentrically within the side wall and projecting from the bottom thereof, said cutters having upstanding top ears which pass removably through the aforesaid slots and are perforated above the top of the holder, and a coupling-rod passing through said perforations and the perforations of the handle ends, and removable therefrom.

3. A dough cutter comprising a holder having a slotted top, a plurality of annular and concentrically arranged cutters carried by the holder, and having upstanding ears which seat removably in the slots of the holder top, and are perforated above the same, and a coupling rod passing through said perforations.

In testimony whereof I affix my signature.

FREDERICK C. MORRIS.